United States Patent
Harris et al.

(10) Patent No.: US 10,126,804 B2
(45) Date of Patent: Nov. 13, 2018

(54) BALANCING INPUT PHASES ACROSS SERVER RACK POWER SUPPLIES

(71) Applicant: Microsoft Technology Licensing, LLC, Redmond, WA (US)

(72) Inventors: Shaun L. Harris, College Station, TX (US); Brandon Aaron Rubenstein, Lynnwood, WA (US); Mark E. Shaw, Sammamish, WA (US); John Joseph Siegler, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 15/048,900

(22) Filed: Feb. 19, 2016

(65) Prior Publication Data

US 2017/0242469 A1    Aug. 24, 2017

(51) Int. Cl.
*H02J 1/00* (2006.01)
*H02J 1/14* (2006.01)
*G06F 1/32* (2006.01)
*H02J 3/26* (2006.01)
*H02J 1/10* (2006.01)
(Continued)

(52) U.S. Cl.
CPC .............. *G06F 1/3203* (2013.01); *H02J 1/00* (2013.01); *H02J 1/102* (2013.01); *H02J 3/26* (2013.01); *H02J 1/08* (2013.01); *H02J 5/00* (2013.01); *Y02E 40/50* (2013.01)

(58) Field of Classification Search
CPC ..................................... H02J 1/00; H02J 1/14
See application file for complete search history.

(56) References Cited

U.S. PATENT DOCUMENTS

| 8,384,244 B2 | 2/2013 | Peterson et al. |
| 8,541,907 B2 * | 9/2013 | Ewing ............... H02G 3/00 307/13 |

(Continued)

FOREIGN PATENT DOCUMENTS

| EP | 674376 A2 | 9/1995 |
| EP | 2003758 A1 | 12/2008 |

OTHER PUBLICATIONS

"International Search Report and Written Opinion Issued in PCT Application No. PCT/US2017/018395", dated May 15, 2017, 15 Pages.

*Primary Examiner* — Hai L Nguyen
(74) *Attorney, Agent, or Firm* — Buckley, Maschoff & Talwalkar LLC

(57) ABSTRACT

Aspects extend to methods, systems, and computer program products for balancing input phases across server rack power supplies. A rack manager can monitor individual Alternating Current (AC) phase currents at the rack level. The rack manager knows (or can at least determine) which power supplies are connected to which phase. The rack manager can micro adjust individual PSU output voltages to balance current phases at the rack level. Balancing can occur in response to changed server workloads, hot-unplug of one or more servers, etc. When there is one PSU per server, phase balancing can be accomplished by connecting outputs of power supplies together via busbar or wire. Output voltages of individual power supplies can be adjusted to achieve better phase balancing. Phase imbalance can be corrected by a bus bar or wire carrying enough load to correct phase imbalance.

17 Claims, 4 Drawing Sheets

(51) Int. Cl.
*H02J 1/08* (2006.01)
*H02J 5/00* (2016.01)

(56) References Cited

U.S. PATENT DOCUMENTS

| | | | |
|---|---|---|---|
| 8,816,527 B1* | 8/2014 | Ramsay | H02J 3/26 |
| | | | 307/14 |
| 9,218,033 B1 | 12/2015 | Roy et al. | |
| 2002/0097564 A1 | 7/2002 | Struhsaker et al. | |
| 2010/0054004 A1 | 3/2010 | Royak et al. | |
| 2010/0211810 A1 | 8/2010 | Zacho | |
| 2014/0268947 A1 | 9/2014 | Phadke | |

* cited by examiner

BALANCING INPUT PHASES ACROSS SERVER RACK POWER SUPPLIES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

Within data centers, computing components can be mounted in racks to provide compute resources, storage resources, and network resources to $3^{rd}$ parties. Power supply units can also be mounted in the racks to provide power to the various computing components. Often, mains power to a data center is three phase 240 V AC. Power supply units can use two of the three phases to convert the mains AC to low-voltage regulated DC power for the computing components.

Within a data center, server loads can swing relatively dramatically taking a server from near 0% utilization to near 100% or vice versa in seconds. Servers can also be hot unplugged, quickly disconnecting the servers from operation. When power supply units use two of the three phases, these occurrences, as well as others, can cause variations in phase currents across the three phases (i.e., the three phases can become unbalanced). To compensate, electronic infrastructure within a data center can be overdesigned.

However, overdesign increases data center cost. For example, with 10% phase imbalance a data center has to be designed to handle 10% more power. Handling more power can be require more robust power supplies, additional wiring, etc.

BRIEF SUMMARY

Examples extend to methods, systems, and computer program products for balancing phases across server rack power supplies. Aspects include balancing the current between phases of three phase power being provided as input to a plurality of power supplies. The three phase power includes a first phase, a second phase, and third phase.

In one aspect, each power supply uses alternating combinations of two phases from among the first phase, the second phase, and the third phase as input. Each power supply outputs direct current (DC) voltage to a common bus bar and a common return bus bar that provides power to a plurality of components.

It is detected that the current for the first phase is imbalanced with at least one of: the current for the second phase and the current for the third phase. At least one power supply, from among the plurality of power supplies, that uses the first phase as input is identified. Output voltage is adjusted for the at least one power supply. The adjusted output voltage modifies current on the common bus bar and the common return bus bar. The modified current changes the input load on the at least one power supply and on at least one other power supply that uses the first phase as input. The changed input load alters the current for the first phase to compensate for the imbalance.

In another aspect, a plurality of power supplies are grouped into a plurality of grouped sets of power supplies. Each grouped set of power supplies includes at least two power supplies that output direct current voltage to power one or more components. The direct current output of each grouped set of power supplies isolated from one another. Each power supply uses alternating combinations of two phases from among the first phase, the second phase, and the third phase as input.

It is detected that the current for the first phase is imbalanced with at least one of: the current for the second phase and the current for the third phase. At least one power supply, from among the plurality of power supplies, that uses a combination of two phases that can be adjusted to compensate for the imbalance is identified. The output voltage for the at least one power supply is adjusted. The adjusted output voltage changes the input load on the at least one power supply. The changed input load alters the current for one or more of: the first phase, the second phase, and the third phase to compensate for the imbalance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
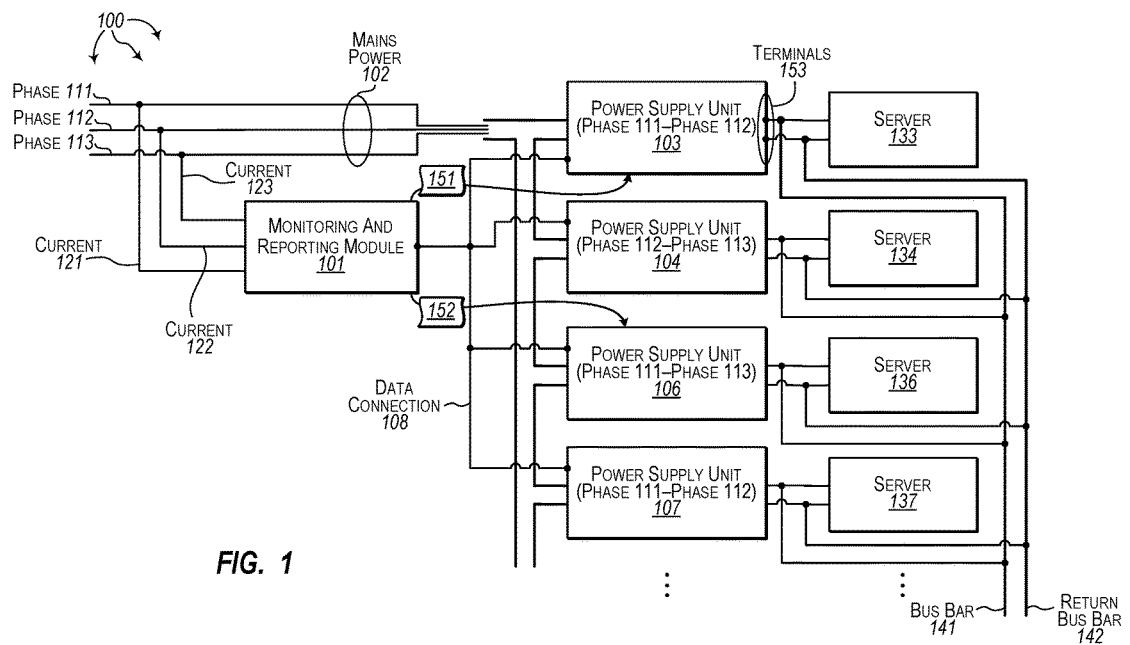
FIG. 1 illustrates an example architecture that facilitates balancing phases across server rack power supplies.

Examples extend to methods, systems, and computer program products for balancing phases across server rack power supplies. Aspects include balancing the current between phases of three phase power being provided as input to a plurality of power supplies. The three phase power includes a first phase, a second phase, and third phase.

In one aspect, each power supply uses alternating combinations of two phases from among the first phase, the second phase, and the third phase as input. Each power supply outputs direct current (DC) voltage to a common bus bar and a common return bus bar that provides power to a plurality of components.

It is detected that the current for the first phase is imbalanced with at least one of: the current for the second phase and the current for the third phase. At least one power supply, from among the plurality of power supplies, that uses the first phase as input is identified. Output voltage is adjusted for the at least one power supply. The adjusted output voltage modifies current on the common bus bar and the common return bus bar. The modified current changes the input load on the at least one power supply and on at least one other power supply that uses the first phase as input. The changed input load alters the current for the first phase to compensate for the imbalance.

In another aspect, a plurality of power supplies are grouped into a plurality of grouped sets of power supplies. Each grouped set of power supplies includes at least two power supplies that output direct current voltage to power one or more components. The direct current output of each grouped set of power supplies isolated from one another. Each power supply uses alternating combinations of two phases from among the first phase, the second phase, and the third phase as input.

It is detected that the current for the first phase is imbalanced with at least one of: the current for the second phase and the current for the third phase. At least one power supply, from among the plurality of power supplies, that uses a combination of two phases that can be adjusted to compensate for the imbalance is identified. The output voltage for the at least one power supply is adjusted. The adjusted output voltage changes the input load on the at least one power supply. The changed input load alters the current for one or more of: the first phase, the second phase, and the third phase to compensate for the imbalance.

Implementations may comprise or utilize a special purpose or general-purpose computer including computer hardware, such as, for example, one or more processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "power supply unit" is defined as a power device that converts mains (e.g., three phase) alternating current (AC) power to regulated DC power for digital components, such as, for example, computers, routers, switches, etc. Regulated DC power can include voltages compatible with various digital components, such as, for example, any of +3.3 V, +5 V, +12 V, and +48V. However, other voltages are also possible. Power supply unit is defined to include switched-mode power supplies. In this description and the following claims a power supply unit may be referred to as a PSU.

Aspects of the invention include adjusting output voltages of PSUs connected to certain phases to increase or decrease contribution of load going to a common bus to balance phases. A rack manager can monitor individual Alternating Current (AC) phase currents at the rack level. The rack manager knows (or can at least determine) which power supplies are connected to which phase. The rack manager can micro adjust individual PSU output voltages to balance current phases at the rack level. Balancing can occur in response to changed server workloads, hot-unplug of one or more servers, etc.

When there is one PSU per server, phase balancing can be accomplished by connecting outputs of power supplies together. For example, 12V/48V outputs can be connected via bus bar or wire. Output voltages of individual power supplies can be adjusted to achieve better phase balancing. Phase imbalance can be corrected by a bus bar or wire carrying enough load (e.g., a smaller fraction of total current) to correct phase imbalance.

FIG. 1 illustrates an example architecture 100 that facilitates balancing phases across server rack power supplies. Referring to FIG. 1, architecture 100 includes monitoring and reporting module 101, power supply units 103, 104, 106, and 107, and servers 133, 134, 136, and 137. Monitoring and reporting module 101, power supplies 103, 104, 106, and 107, and servers 133, 134, 136, and 137 can be connected to (or be part of) a network, such as, for example, a Local Area Network ("LAN"), a Wide Area Network ("WAN"), and even the Internet. Accordingly, monitoring and reporting module 101, power supplies 103, 104, 106, and 107, and servers 133, 134, 136, and 137 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, monitoring and reporting module 101, power supplies 103, 104, 106, and 107, and servers 133, 134, 136, and 137 are included in a rack within a data center. The rack can also include other components, such as, for example, other servers, other PSUs, other batteries, storage devices (e.g., Solid State Drives (SSDs) and/or magnetic hard drives), networking equipment, etc. The data center can also include one or more additional racks that contain servers, PSUs, batteries, storage devices, networking equipment, etc.

Monitoring and reporting module 101 (e.g., a rack manager) monitors currents 121, 122, and 123 for phases 111, 112, and 123 respectively of mains power 102. Depending on the country, mains power connection 102 can be three phase AC ranging from 100-240 Volts (expressed as root-mean-square) operating and 50 Hz or 60 Hz. PSUs 103, 104, 106, and 107 can be adapted to country of operation.

Monitoring and reporting module 101 is connected to PSUs 103, 104, 106, and 107 by data connection 108. Data connection 108 can be any of a variety of communication mechanisms including: a System Management Bus (SMB), an RS-232 serial console, address and data lines, an Inter-Integrated Circuit (I²C) bus, a Serial Peripheral Interface (SPI) bus, an Intelligent Platform Management Bus (IPMB), Ethernet, or power line communication. Data connection 108 permits monitoring and reporting module 101 to identify PSU locations and send micro adjustments to PSUs.

As depicted in architecture 100, phases 111, 112, and 113 are arranged in a "Delta" configuration. As such, mains power 102 is a 3-phase, 3-wire system. Each of PSUs 103, 104, 106, 107, etc. uses an alternating combination of two phases from among phases 111, 112, and 113 as input. For example, PSU 103 uses phases 111 and 112 as input, PSU 104 uses phases 112 and 113 as input, PSU 106 uses phases 111 and 113 as input, PSU 107 uses phases 111 and 112 as input.

In another aspect, phases 111, 112, and 113 are arranged in a "Wye" (sometimes also referred to as Y or Star) configuration. When phases 111, 112, and 113 are arranged in a Wye configuration, mains power 102 can also include a neutral (connected to a common point with all three phases). As such, mains power 102 can be a 3-phase, 4-wire system. In a 3-phase, 4-wire system, each of PSUs 103, 104, 106, 107, etc. can use one of phases 111, 112, and 113 and the neutral as input. For example, PSU 103 can use phase 111 and neutral as input, PSU 104 can use phases 112 and neutral as input, PSU 106 can use phase 113 and neutral as input, PSU 107 can use phases 111 and neutral as input.

When mains power 102 is a 3-phase, 4-wire system, monitoring and reporting module 101 can also monitor the neutral.

Each of PSUs 103, 104, 106, 107, etc. outputs DC voltage to common busbar 141 and common return busbar 142. Common busbar 141 and common return busbar 142 provide DC power to other components in a rack with monitoring and reporting module 101 and PSUs 103, 104, 106, and 107. For example, servers 133, 134, 136, and 137 are powered from the DC voltage on busbar 141 and return busbar 142.

Figure 2:
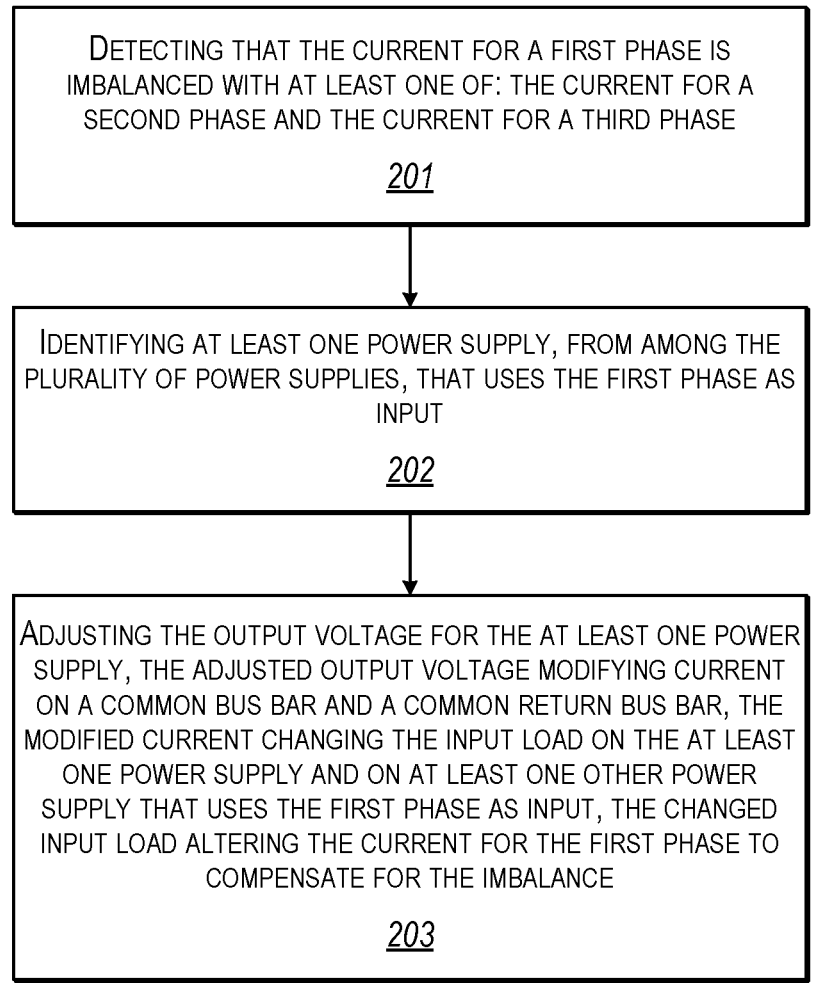
FIG. 2 illustrates a flow chart of an example method for balancing phases across server rack power supplies.

FIG. 2 illustrates a flow chart of an example method for balancing phases across server rack power supplies. Method 200 will be described with respect to the components and data of computer architecture 100.

Method 200 includes detecting that the current for a first phase is imbalanced with at least one of: the current for a second phase and the current for a third phase (201). For example, monitoring and reporting module 101 can detect that current 121 is imbalanced with (e.g., is greater than or less than) current 122 and/or is imbalanced with (e.g., is greater than or less than) current 123.

Method 200 includes identifying at least one power supply, from among the plurality of power supplies, that uses the first phase as input (202). For example, monitoring and reporting module 101 can identify PSU 103 and/or PSU 105 as using phase 111 as input.

Method 200 includes adjusting the output voltage for the at least one power supply, the adjusted output voltage modifying current on the common bus bar and the common return bus bar, the modified current changing the input load on the at least one power supply and on at least one other power supply that uses the first phase as input, the changed input load altering the current for the first phase to compensate for the imbalance (203). For example, monitoring and reporting module 101 can send micro adjustments 151 and 152 to PSUs 103 and 106 respectively over data connection 108. Micro adjustments 151 and 152 adjust (e.g., increase or decrease) the output voltages provided by PSUs 103 and 106. The adjusted output voltages provided by PSUs 103 and 106 modify the current on busbar 141 and return busbar 142. The modified current changes the input load on PSUs 103 and 106. The changed input loads on PSUs 103 and 106 alter (e.g., increase or decrease) current 121 to compensate for the imbalance between current 121 and currents 122 and/or 123.

Method 200 can also be used when mains power 102 is in a Wye configuration. Monitoring and reporting module 101 can also monitor a neutral connection to detect current imbalances between phases 111, 112, and 113. Monitoring and reporting module 101 can send micro adjustments to adjust (e.g., increase or decrease) output voltages provided by PSUs.

In one aspect, detecting that current 121 is imbalanced includes detecting the voltage on bus bar 141 from the perspective of a power supply and detecting the actual current output at the power supply. For example, the voltage between terminals 152 can be detected. The actually output current at the power supply is detected. For example, the current at terminals 153 can be detected. It can be determined that the actual output current is imbalanced based on the actual output current differing from a predefined output current for the detected voltage. For example, it can be determined that the output current at terminals 153 is imbalanced based on the actual output current differing from a predefined output current based on the detected voltage at terminals 153.

Location bits can be floating or grounded to identify where a PSU is in a rack and which phases it has as input. Individual PSUs can cap voltage margin increase to prevent over current. In one aspect, up to 120% over current is allowed for specified time (e.g., up to approximately 10 seconds) depending on a thermal time constant. Busbar 141 and return busbar 142 can be sized to supply servers with needed power if a PSU fails. Alternately, Busbar 141 and return busbar 142 can be sized to balance phase currents, for example, to 10 or 20 amps.

Figure 3:
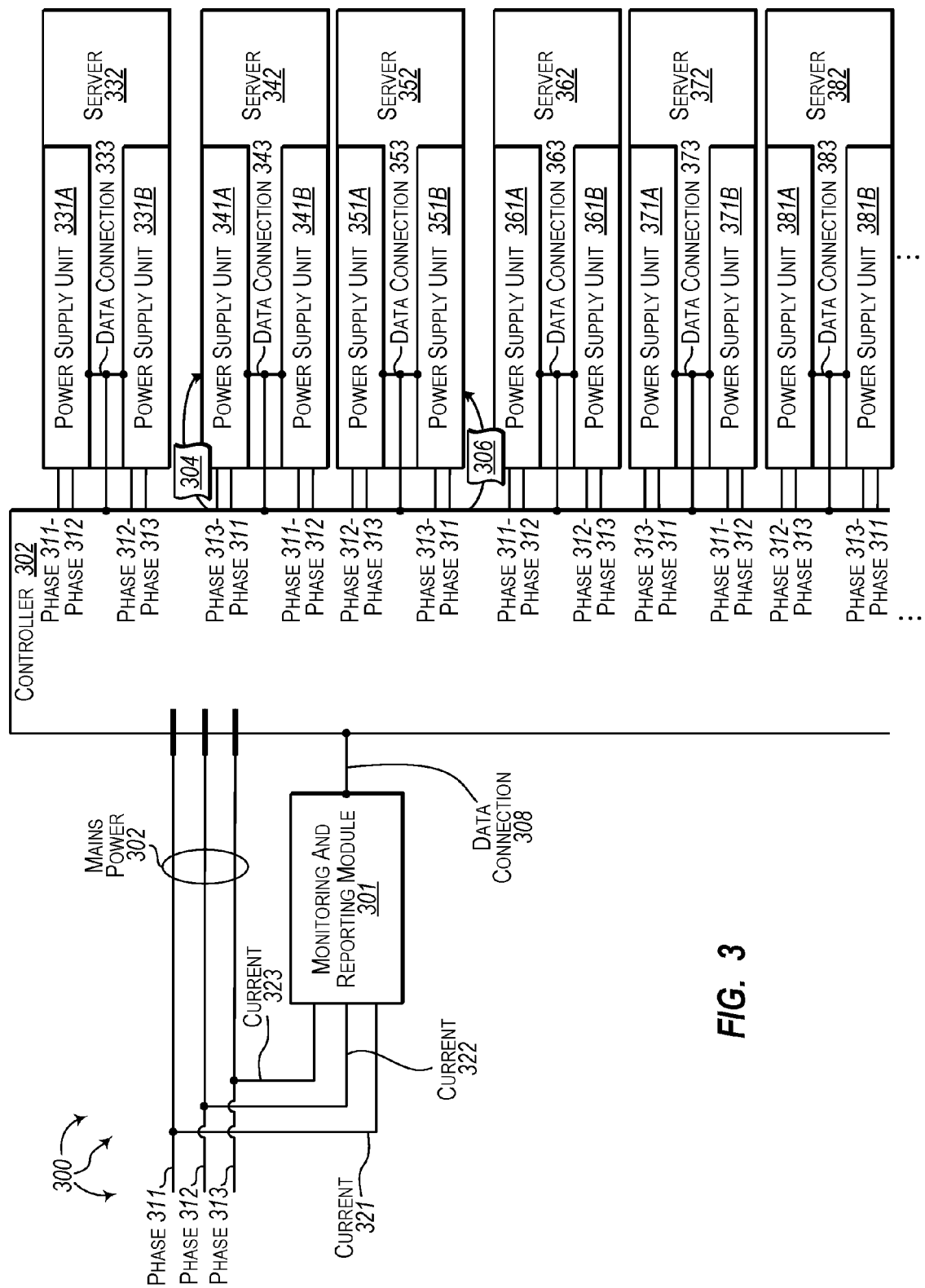
FIG. 3 illustrates an example architecture that facilitates balancing phases across server rack power supplies.

FIG. 3 illustrates an example architecture 300 that facilitates balancing phases across server rack power supplies. Referring to FIG. 3, architecture 300 includes monitoring and reporting module 301, controller 302, power supply units 331A, 331B, 341A, 341B, 351A, 351B, 361A, 361B, 371A, 371B, 381A, and 381B, and servers 332, 342, 352, 362, 372, and 382. The depicted components can be connected to (or be part of) a network, such as, for example, a Local Area Network ("LAN"), a Wide Area Network ("WAN"), and even the Internet. Accordingly, the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, monitoring and reporting module 301, controller 302, power supply units 331A, 331B, 341A, 341B, 351A, 351B, 361A, 361B, 371A, 371B, 381A, and 381B, and servers 332, 342, 352, 362, 372, and 382 are included in a rack within a data center. The rack can also include other components, such as, for example, other servers, other PSUs, other batteries, storage devices (e.g., Solid State Drives (SSDs) and/or magnetic hard drives), networking equipment, etc. The data center can also include one or more additional racks that contain servers, PSUs, batteries, storage devices, networking equipment, etc.

Monitoring and reporting module 301 (e.g., a rack manager) monitors currents 321, 322, and 323 for phases 311, 312, and 323 respectively of mains power 302. Depending on the country, mains power connection 302 can be three phase AC ranging from 100-240 Volts (expressed as root-mean-square) operating and 50 Hz or 60 Hz. PSUs 331A, 331B, 341A, 341B, 351A, 351B, 361A, 361B, 371A, 371B, 381A, and 381B can be adapted to country of operation.

Monitoring and reporting module 301 is connected to controller 302 by data connection 303. Controller 302 is in turn connected to PSUs 331A and 331B, PSUs 341A and 341B, PSUs 351A and 351B, PSUs 361A and 361B, PSUs 371A and 371B, and PSUs 381A and 381B by data connections 333, 343, 353, 363, 373, and 383 respectively. Data connections 303, 333, 343, 353, 363, 373, and 383 can be any of a variety of communication mechanisms including: a System Management Bus (SMB), an RS-232 serial console, address and data lines, an Inter-Integrated Circuit (I$^2$C) bus, a Serial Peripheral Interface (SPI) bus, an Intelligent Platform Management Bus (IPMB), Ethernet, or power line communication. Data connections 303, 333, 343, 353, 363, 373, and 383 permit monitoring and reporting module 301 and controller 302 to interoperate to identify PSU locations and send micro adjustments to PSUs.

As depicted in architecture 300, phases 311, 312, and 313 are arranged in a "Delta" configuration. As such, mains power 302 is a 3-phase, 3-wire system. Each of PSUs 331A, 331B, 341A, 341B, 351A, 351B, 361A, 361B, 371A, 371B, 381A, and 381B etc. uses an different combination of two phases from among phases 311, 312, and 313 as input. For example, PSUs 331A, 341B, 361A, and 371B use phases 311 and 312 as input. PSUs 331B, 351A, 361B, and 381A use phases 312 and 313 as input. PSUs 341A, 351B, 371A, and 381B use phases 313 and 311 input.

In another aspect, phases 311, 312, and 313 are arranged in a "Wye" (sometimes also referred to as Y or Star) configuration. When phases 311, 312, and 313 are arranged in a Wye configuration, mains power 302 can also include a neutral (connected to a common point with all three phases). As such, mains power 302 can be a 3-phase, 4-wire system. In a 3-phase, 4-wire system, each of PSUs 331A, 331B, 341A, 341B, 351A, 351B, 361A, 361B, 371A, 371B, 381A, and 381B etc. can use one of phases 311, 312, and 313 and the neutral as input. For example, PSUs 331A, 341B, 361A, and 371B can use phase 311 and neutral as input. PSUs 331B, 351A, 361B, and 381A can use phase 312 and neutral as input. PSUs 341A, 351B, 371A, and 381B can use phase 313 and neutral as input.

When mains power 302 is a 3-phase, 4-wire system, monitoring and reporting module 301 can also monitor the neutral.

Figure 4:
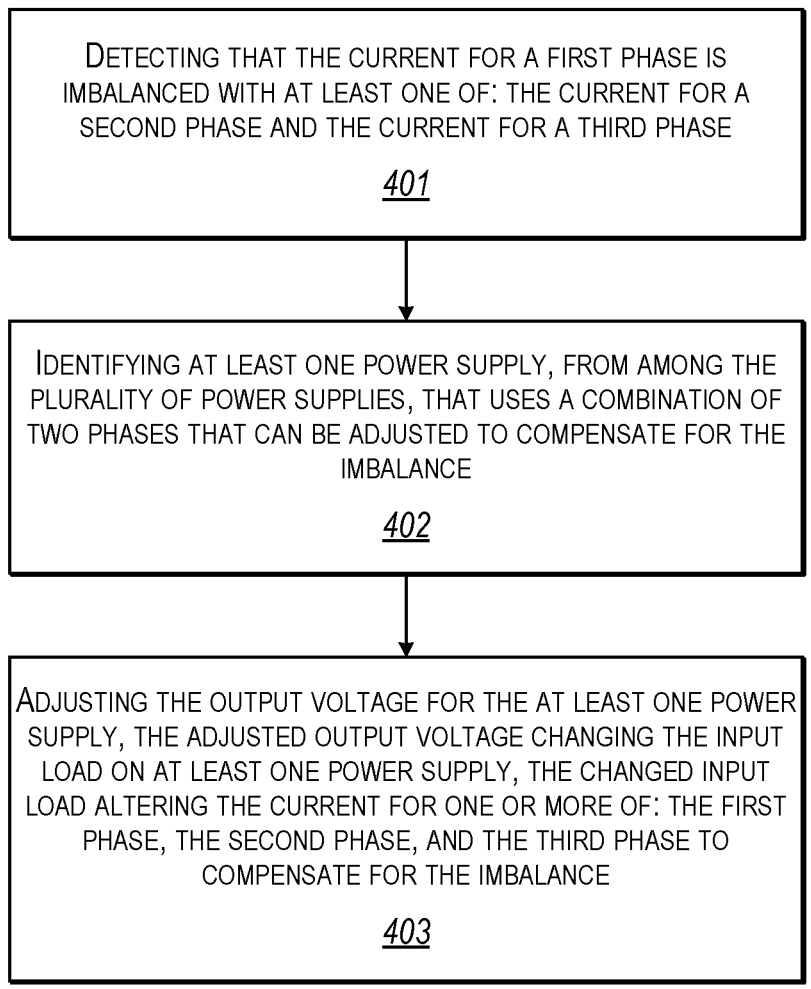
FIG. 4 illustrates a flow chart of an example method for balancing phases across server rack power supplies.

FIG. 4 illustrates a flow chart of an example method for balancing phases across server rack power supplies.

Method 400 includes detecting that the current for the first phase is imbalanced with at least one of: the current for the second phase and the current for the third phase (401). For example, monitoring and reporting module 301 can detect that current 322 is imbalanced with (e.g., is greater than or less than) current 321 and/or is imbalanced with (e.g., is greater than or less than) current 323.

Method 400 includes identifying at least one power supply, from among the plurality of power supplies, that uses a combination of two phases that can be adjusted to compensate for the imbalance (402). For example, monitoring and reporting module 301 and controller 302 can interoperate to identify PSUs 341A and 351B. PSUs 341A and 351B use phases 311 and 313 and can be adjusted to compensate for the imbalance in phase 312.

Method 400 includes adjusting the output voltage for the at least one power supply, the adjusted output voltage changing the input load on the at least one power supply, the changed input load altering the current for one or more of: the first phase, the second phase, and the third phase to compensate for the imbalance (403). For example, monitoring and reporting module 301 can send micro adjustments 304 and 306 to PSUs 341A and 351B respectively over data connections 343 and 353 respectively. Micro adjustments 304 and 306 adjust (e.g., increase or decrease) the output voltages provided by PSUs 341A and 351B. The adjusted output voltages change (e.g., increase or decrease) the input load at PSUs 341A and 351B. The changed input loads alter (e.g., increase or decrease) currents 321 and 323 to compensate for the imbalance in current 322.

Method 400 can also be used when mains power 302 is in a Wye configuration. Monitoring and reporting module 301 can also monitor a neutral connection to detect current imbalances between phases 311, 312, and 313. Monitoring and reporting module 301 can send micro adjustments to adjust (e.g., increase or decrease) output voltages provided by PSUs.

A set of location bits can be used per server. Locations bits can be floating or grounded to identify where a PSU is in a rack and which phases it has as input. Individual PSUs can cap voltage margin increase to prevent over current. In one aspect, up to 120% over current is allowed for a specified time (e.g., up to approximately 10 seconds) depending on a thermal time constant.

Accordingly, aspects of the invention can be used to compensate for phase imbalance due to changing server workloads as well as phase imbalance due to hot-unplug of a server within a rack.

In one aspect, a system includes a plurality of servers mounted in a rack and a plurality of power supply units mounted in the rack. Each power supply unit uses alternating combinations of two phases from among: a first phase, a second phase, and a third phase of mains power as input. Each power supply unit provides direct current output voltage to power at least a subset of the plurality of servers.

A rack manager, using a processor, is configured to detect that the current for the first phase is imbalanced with at least one of: the current for the second phase and the current for the third phase. The rack manager, using the processor, is configured to identify at least one power supply, from among the plurality of power supplies, that uses a combination of two phases that can be adjusted to compensate for the imbalance. The rack manager, using the processor, is configured to adjust the output voltage for the at least one power supply. The adjusted output voltage changes the input load on the at least one power supply. The changed input load altering the current for one or more of: the first phase, the second phase, and the third phase to compensate for the imbalance.

In another aspect, a method for balancing the current between phases of three phase power being provided as input to a plurality of power supplies is performed. It is detected that detecting that the current for a first phase is imbalanced with at least one of: the current for a second phase and a current for the third phase. At least one power supply, from among the plurality of power supplies, that uses the first phase as input is identified.

The output voltage for the at least one power supply is adjusted. The adjusted output voltage modifies current on a common bus bar and a common return bus bar. The modified current changes the input load on the at least one power supply and on at least one other power supply that uses the first phase as input. The changed input load alters the current for the first phase to compensate for the imbalance.

In a further aspect, a computer program product includes computer-executable instructions that, when executed at a processor, cause a computer system to perform the method for balancing the current between phases of three phase power being provided as input to a plurality of power supplies as defined for the other aspect.

In an additional aspect, a method for balancing the current between phases of three phase power being provided as input to a plurality of power supplies is performed. It is detected that the current for a first phase is imbalanced with at least one of: the current for a second phase and the current for a third phase. At least one power supply, from among the plurality of power supplies, that uses a combination of two phases that can be adjusted to compensate for the imbalance; is identified. The output voltage is adjusted for the at least one power supply. The adjusted output voltage changes the input load on the at least one power supply. The changed input load alters the current for one or more of: the first phase, the second phase, and the third phase to compensate for the imbalance.

In a further additional aspect, a computer program product includes computer-executable instructions that, when executed at a processor, cause a computer system to perform the method for balancing the current between phases of three phase power being provided as input to a plurality of power supplies as defined for the additional aspect.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method for balancing current between phases of three phase power input to a plurality of power supplies, the three phase power including a first phase, a second phase, and a third phase, each power supply using alternating combinations of two of the three phases, and each power supply outputting direct current voltage to a common bus bar that provides power to a plurality of components, the method comprising:

detecting that the current of the first phase is imbalanced with at least one of the current of the second phase and the current of the third phase, based on a measurement of the current of the first phase read from one or more of an input line to the common bus bar;

identifying at least one power supply, from among the plurality of power supplies, that uses the current of the first phase as input; and adjusting the output voltage for the at least one power supply to balance the current of the first phase with respect to the at least one of the current of the second and the third phase, the adjusting causing a change in an input load on the at least one power supply thereby altering the current of the first phase to compensate for the imbalance in currents.

2. The method of claim 1, wherein detecting that the current of the first phase is imbalanced comprises receiving communication from at least one of the one or more other power supplies via communication interface, the communication interface selected from among: I²C (Inter-Integrated Circuit), SPI (Serial Peripheral Interface) or Ethernet.

3. The method of claim 1, wherein detecting that the current of the first phase is imbalanced comprises at a power supply from among the one or more other power supplies:

detecting the voltage on a shared line shared between the plurality of power supplies;

detecting the actual output current at the power supply; and determining that the actual output current is imbalanced based on the actual output current differing from a predefined output current for the detected voltage.

4. The method of claim 1, wherein detecting that the current of the first phase is imbalanced comprises detecting that the current of the first phase is greater than at least one of: the current of the second phase and the current of the third phase; and wherein adjusting the output voltage for the at least one power supply comprises increasing the output voltage for the at least one power supply to reduce the current of the first phase to compensate for the imbalance.

5. The method of claim 1, wherein detecting that the current of the first phase is imbalanced comprises detecting that the current of the first phase is less than at least one of: the current of the second phase and the current of the third phase; and wherein adjusting the output voltage for the at least one power supply comprises decreasing the output voltage for the at least one power supply to increase the current of the first phase to compensate for the imbalance.

6. The method of claim 1, wherein adjusting the output voltage for the at least one power supply comprises using a communication interface to adjust the output voltage for the at least one power supply, the communication interface selected from among: I²C (Inter-Integrated Circuit), SPI (Serial Peripheral Interface) or Ethernet.

7. The method of claim 1, wherein adjusting the output voltage for the at least one power supply comprises sending a micro adjustment to the at least one power supply.

8. The method of claim 1, wherein adjusting the output voltage for the at least one power supply comprises adjusting the output voltage too temporarily over current the at least one power supply.

9. The method of claim 1, wherein executing the instructions further causes the one or more processors to adjust the output voltage to temporarily enable over current for the at least one power supply.

10. The method of claim 1, wherein the detecting the current of the first phase is imbalanced is determined based on an amount of current of the first phase being greater than or less than a predefined amount of current.

11. A system comprising:

a plurality of power supplies using alternating combinations of two phases from among a first phase, a second phase, and a third phase of three phase power, each power supply outputting direct current voltage to a common bus bar;

one or more processors; and system memory coupled to the one or more processor and storing program instructions, wherein executing the program instructions causes the one or more processors to:

detect that current of the first phase is imbalanced with at least one of the current of the second phase and the current of the third phase, based on a measurement of the current of the first phase read from one or more of an input line to the common bus bar;

identify a first power supply that uses the current of the first phase as an input; and adjust the output voltage for the first power supply to balance the current of the first phase with respect to the at least one of the current of the second and the third phase, the adjustment causing a change in an input load on the first power supply and on at least one other power supply thereby altering the current of the first phase to compensate for the imbalance in currents.

12. The system of claim 11, wherein executing the instructions further causes the one or more processors to receive communication via communication interface selected from among: I²C (Inter-Integrated Circuit), SPI (Serial Peripheral Interface) or Ethernet.

13. The system of claim 11, wherein executing the instructions further causes the one or more processors to:

detect a voltage on a shared line shared between the plurality of power supplies;

detect an actual output current at a power supply from among the one or more other power supplies; and determine that the actual output current is imbalanced based on the actual output current differing from a predefined output current for the detected voltage.

14. The system of claim 11, wherein the executing the instructions further causes the one or more processors to increase the output voltage for the first power supply to reduce the current for the first phase to compensate for the imbalance.

15. The system of claim 11, wherein the executing the instructions further causes the one or more processors to decrease the output voltage for the first power supply to increase the current for the first phase to compensate for the imbalance.

16. The system of claim 11, wherein executing the instructions further causes the one or more processors to use a communication interface to adjust the output voltage for the first power supply, the communication interface selected from among: I²C (Inter-Integrated Circuit), SPI (Serial Peripheral Interface) or Ethernet.

17. The system of claim 11, wherein executing the instructions further causes the one or more processors to send a micro adjustment to the first power supply.

\* \* \* \* \*